United States Patent [19]
Richard et al.

[11] Patent Number: 5,828,899
[45] Date of Patent: Oct. 27, 1998

[54] SYSTEM FOR PERIPHERAL DEVICES RECURSIVELY GENERATING UNIQUE ADDRESSES BASED ON THE NUMBER OF DEVICES CONNECTED DEPENDENT UPON THE RELATIVE POSITION TO THE PORT

[75] Inventors: Elizabeth A. Richard, Cypress; Ralph K. Williamson, Spring, both of Tex.; Stephen D. Teter, San Jose, Calif.

[73] Assignee: Compaq Computer Corporation, Houston, Tex.

[21] Appl. No.: 583,206

[22] Filed: Jan. 4, 1996

[51] Int. Cl.⁶ .................................................. G06F 3/00
[52] U.S. Cl. ............................................................ 335/828
[58] Field of Search ...................... 364/238.3; 395/500, 395/828, 829, 800

[56] References Cited

U.S. PATENT DOCUMENTS

| | | | |
|---|---|---|---|
| 4,660,141 | 4/1987 | Ceccon et al. | 395/829 |
| 4,701,878 | 10/1987 | Gunkel et al. | 395/282 |
| 4,727,475 | 2/1988 | Kiremidjian | 395/284 |
| 4,773,005 | 9/1988 | Sullivan | 395/829 |
| 5,175,822 | 12/1992 | Dixon et al. | 395/829 |
| 5,317,693 | 5/1994 | Cuenod et al. | 395/829 |
| 5,386,567 | 1/1995 | Lien et al. | 395/653 |
| 5,404,460 | 4/1995 | Thomsen et al. | 395/829 |
| 5,428,748 | 6/1995 | Davidson et al. | 395/829 |
| 5,513,182 | 4/1996 | Kawamura et al. | 370/94.3 |
| 5,537,597 | 7/1996 | Sandage | 395/700 |
| 5,548,782 | 8/1996 | Michael et al. | 395/835 |
| 5,555,374 | 9/1996 | Armerding et al. | 395/200.02 |
| 5,611,055 | 3/1997 | Krishnan et al. | 395/281 |

OTHER PUBLICATIONS

Universal Serial Bus Specification, Revision 1.0, Compaq Computer Corporation et al., pp. 1–268 (Jan. 1996).
Access.bus Specification, Version 3.0, Access.bus Industry Group, pp. 1–1 to 9–7 (Sep. 1995).
PCI Local Bus Specification, Production Version, Revision 2.1, pp. 1–281 (Jun. 1995).
Amiga Hardware Reference Manual, 3rd Ed., Commodore–Amiga, Inc., pp. 383–439 (1991).
Addendum to the Zorro III Bus Specification, Zorror III Bus Timing, Revision 1.0, Commodore–Amiga, Inc., pp. 1–12 (Apr. 1993).
Adam J. Kunzman, et al., "1394 High Performance Serial Bus: The Digital Interface for ATC," *IEEE Transactions on Consumer Electronics*, vol. 14, pp. 893–900 (Aug. 1995).

*Primary Examiner*—Thomas C. Lee
*Assistant Examiner*—Anderson I. Chen
*Attorney, Agent, or Firm*—Fish & Richardson P.C.

[57] ABSTRACT

A system for allowing a peripheral device to be inserted directly into a port of a computer system while the computer system is powered on. The insertion of a peripheral device into the computer system port is automatically detected, and a configuration operation is automatically performed when insertion of the peripheral device is detected. The system also allows a plurality of peripheral devices to be connected to a single port of a computer system by automatically determining the number of peripheral devices and assigning a unique address to each of the peripheral devices. The peripheral device may have a host port for communicating with the computer system, a slave port for connecting to a slave device, and a device manager which identifies if a slave device is connection.

51 Claims, 10 Drawing Sheets

SYSTEM FOR PERIPHERAL DEVICES RECURSIVELY GENERATING UNIQUE ADDRESSES BASED ON THE NUMBER OF DEVICES CONNECTED DEPENDENT UPON THE RELATIVE POSITION TO THE PORT

BACKGROUND

This invention relates to computer peripheral devices.

A peripheral port, such as a keyboard port, a mouse port, or a serial interface port, is used in a computer system to connect to a peripheral device. Generally, each peripheral port is designed for connection to a specific type of peripheral device and is connectable to only one peripheral device. Solutions exist in which customized hardware interfaces are attached to an existing computer peripheral port to allow different types of and multiple peripheral devices to be attached to the computer port. Installation of the customized hardware requires that the computer case be opened.

SUMMARY

In general, in one aspect, the invention features a system for allowing a peripheral device to be inserted directly into a port of the computer system while the computer system is powered on. The insertion of a peripheral device into the computer system port is automatically detected, and a configuration operation is automatically performed when insertion of the peripheral device is detected.

Implementations of the invention include the following features. The configuration operation may also automatically be performed once removal of the peripheral device from the computer system port is detected. The computer system may include a storage device which contains a device driver, which is retrieved during the configuration operation. The computer system may also include a memory, which is loaded with the device driver during the configuration operation. In addition, the configuration operation may also check for a device type of the peripheral device, with the device driver retrieved from this first device based on the device type. The configuration operation may also include determining a logical address of the peripheral device. The second peripheral device can be connected to the first peripheral device. The configuration operation may include issuing a configuration command to the first peripheral device. If the first peripheral device receives the configuration command and determines that the second peripheral device is connected, the first peripheral device may forward the configuration command to the second peripheral device. The logical address for the first peripheral device may be set according to whether the second peripheral device is connected to the first peripheral device. In addition, the peripheral device may also perform a self test during the configuration operation.

In general, in another aspect, the invention features a system for allowing a plurality of peripheral devices to be connected to a single port of a computer system. The number of peripheral devices connected to the single port is automatically determined, and an unique address is assigned to each of the peripheral devices.

Implementations of the invention include the following features. Data may be routed between the computer system and the peripheral devices based on an address associated with the data. The type of each peripheral device may also be automatically determined. The computer system may include a memory, and the plurality of device drivers may be automatically loaded into the computer system memory with each device driver corresponding to a peripheral device. A routing table may also be set up having a plurality of entries, with each entry corresponding to a peripheral device and containing a device driver name and the address of the corresponding peripheral device. Data may be routed between the device drivers and the peripheral devices based on the routing table and an address associated with the data. Entries may be added to the routing table as additional peripheral devices are added, and entries may be removed from the routing table as peripheral devices are removed. Peripheral devices may be connected in one of the plurality of hardware configurations. A first peripheral device may be connected directly to the computer system port, with at least one other peripheral device being connected to the computer system port through the first peripheral device. The computer system port may be a serial port.

In general, according to another aspect, the inventions features a peripheral device for use with a computer system. The peripheral device has a host port for communicating with the computer system, a slave port for connecting to a slave device, and a device manager which identifies if a slave device is connection.

Implementations of the invention include the following features. The device manager may also route data between the computer system, the peripheral device, and the slave device. Automatic address assignment may be performed by the device manager based on whether the slave device is connected. The device manager may perform a power on sequence to determine if it is functioning properly. The device manager may also notify the computer system if the slave device is added to or removed from the slave port.

In general, according to another aspect, the invention features a peripheral device for use with a computer system having a peripheral port. The peripheral device includes a host port for directly connecting to the computer system peripheral port, a user interface connected to the host port, a slave port connected to the host port, and a device manager which notifies the computer system when it is inserted into the computer system peripheral port.

In general, according to another aspect, the invention features a port manager in a computer system having a device driver, a configuration manager, and a peripheral port for connecting to a peripheral device. The port manager includes a first device interfaced to the peripheral port for communicating with the peripheral device, and a second device interfaced to the device driver and the configuration manager for routing data between the device driver and the peripheral device and for routing configuration information between the configuration manager and the peripheral device.

In general, according to another aspect, the invention features a configuration manager in a computer system having a port manager and a peripheral port for connecting directly to a peripheral device. The configuration manager includes a first device interfaced to the port manager for receiving the notification. The configuration also includes a second device which responds to the notification by performing a configuration operation.

Implementations of the invention have one or more of the following advantages. Different types of peripheral devices may be connected to a single existing port. Multiple peripheral devices which may be arranged in a plurality of different configurations may be connected to the existing port. The peripheral devices may be inserted into or removed from the port while the computer system remains powered on. No additional hardware need be added to the computer system to support the features listed above.

Other advantages and features will become apparent from the following description and from the claims.

DESCRIPTION

FIG. 4 is a block diagram of a data packet.

Figure 1:
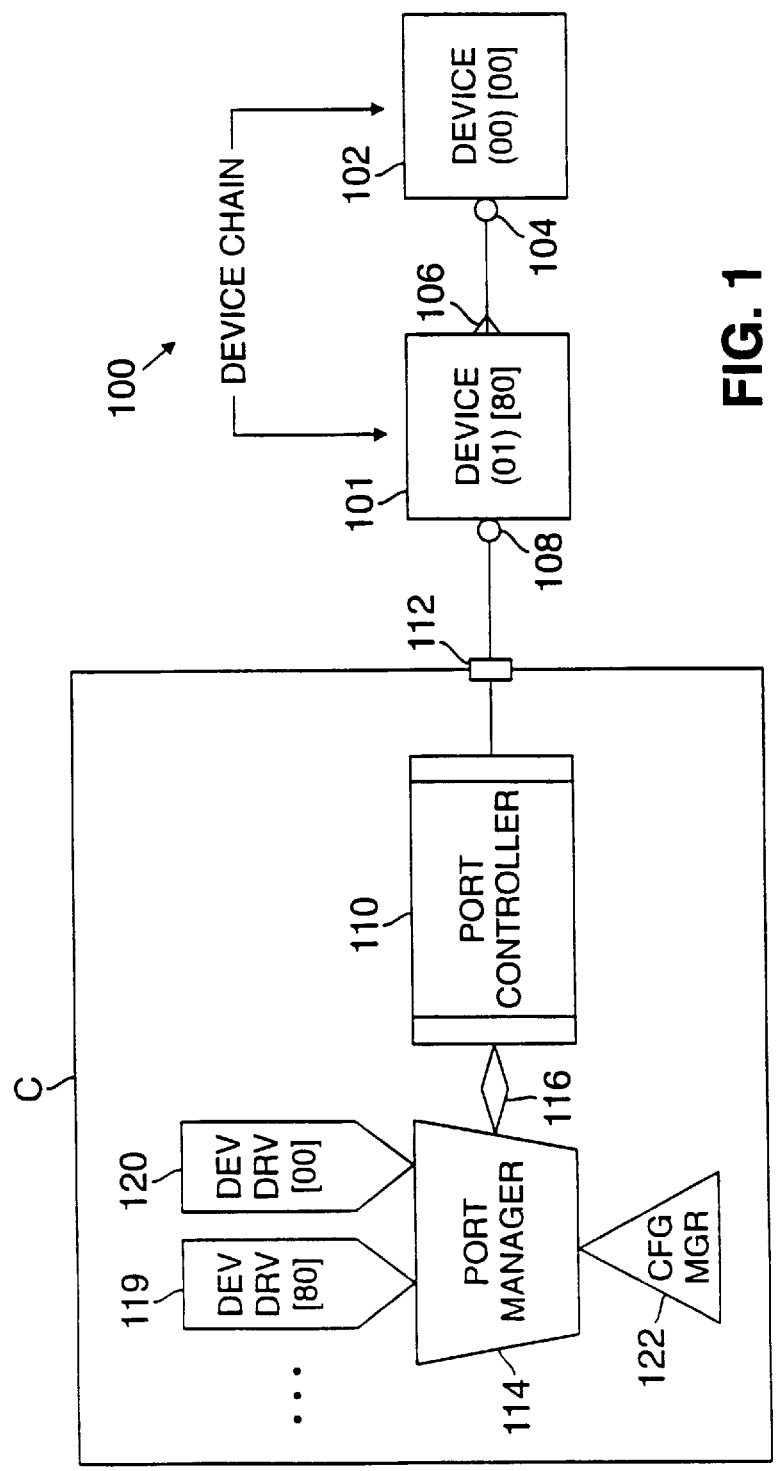
FIG. 1 is a schematic block diagram of a peripheral device attachment scheme.

Referring to FIG. 1, a so-called Q-PORT system includes the following layers: a device chain 100, a port controller 110, a port manager 114, a configuration manager 122, and device drivers 118 and 120. All the layers are contained in a host computer system C except the device chain 100. The port controller 110 (e.g., an 8042 microcontroller from Intel Corporation) is the hardware interface in the Q-PORT system and its associated software. The port controller 110 converts the serial bitstream used by the device chain 100 into a byte format used by software in the host computer system C. The port manager 114, which interfaces to the port controller 110 using a byte-oriented, interrupt driven software interface, is a low level software program which routes packetized data to and from the appropriate device driver. The port controller 110 signals the port manager 114 when a byte has been received from the device chain 100 and the port manager 114 can write a byte into the port controller 110 for distribution down the device chain 100. The configuration manager 122, which can be considered a special-purpose device driver for the Q-PORT system S, is a software program which keeps track of the hardware configuration of the Q-PORT system S and searches for and attaches the appropriate device drivers for the peripheral devices 101 and 102.

The device drivers 118 and 120, which communicate with the port manager 114 using a packet-oriented, interrupt driven software interface, act as the interface for data transferred between the device chain 100 and programs in the host computer system C, such as applications programs. With the exception of the configuration manager's interface, the interfaces to the device drivers 118 and 120 are standard. The port manager 114 signals a device driver when a packet destined for that device driver is received from the device chain 100. Header information is removed from the packet before it is transmitted to the device driver. The port manager 114 accepts a packet from a device driver and passes it on to the port controller 110, after header information is added to the packet, for transmission to the appropriate device in the device chain 100. The operations of the port manager 114, configuration manager 122, and port controller 110 are transparent to the device drivers 118 and 120.

The device chain 100 is made up of physical peripheral devices 101 and 102, which may be either legacy devices or Q-PORT devices that communicate serially. The legacy devices and Q-PORT devices can be standard peripheral devices such as a keyboard, a mouse or a joystick, or special-purpose peripheral devices such as game input devices (e.g. video game input pads), medical input devices (e.g. input control pads, sensors), or remote communication devices (e.g. infrared, microwave, or radio devices) for communicating with remote input devices. Each of the peripheral devices includes a user interface.

In FIG. 1, the peripheral device 102 is a legacy device and the peripheral device 101 is a Q-PORT device. The peripheral devices 101 and 102 can be added or removed and the Q-PORT system can reconfigure dynamically in an auto-configuration cycle. Each device is associated with a unique logical device address and device type set during the auto-configuration cycle. The legacy and Q-PORT devices can be connected by chaining, as shown by examples in FIGS. 1 and 2, or by attaching chains in a star configuration using a star concentrator, as shown by the example in FIG. 3.

The Q-PORT device 101 has a host port 108 connected to a computer port 112 and a slave port 106 connected to a host port 104 of the legacy device 102. The computer port 112 can be a standard port, such as a PS/2 style mouse port. Q-PORT and legacy devices can be inserted and removed from the computer port 112 while the computer system remains powered on, without requiring additional hardware interface.

The various ports may be connected using standard connectors such as 6-Pin Mini-DIN connectors. Each connector has a data or DAT signal and a clock or CLK signal. A device plugged into the slave port 106 is referred to as a "slave" or "down from" or "below" that Q-PORT device, and a device plugged into the host port 108 is referred to as a "host" or "up from" or "above" that Q-PORT device. The host computer system C is defined as being at the top of the chain. A Q-PORT device which has nothing connected to its slave port is at the bottom of the chain. In each of the configurations shown in FIGS. 1–3, only one computer port 112 is needed to connect to multiple peripheral devices. The functions performed by the Q-PORT device are controlled by a device manager in the Q-PORT device. The Q-PORT device is an "intelligent" peripheral device, and the device manager may be implemented with a microcontroller and associated software in the Q-PORT device.

Figure 2:
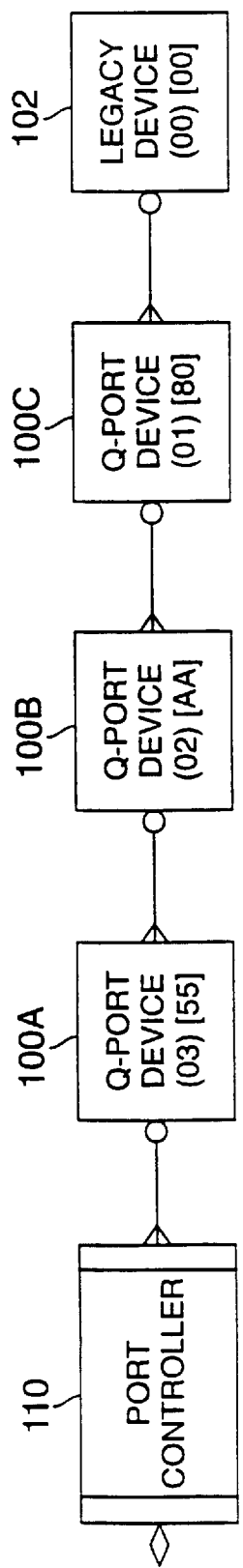
FIG. 2 is a schematic block diagram of a serial chain of peripheral devices.

Multiple Q-PORT devices each having a distinct logical address can be connected in a chain. The device at the bottom of the chain has a logical device address of 0x00. Each device above increments the logical device address from the one below it (excluding reserved logical device addresses). For example, a chain with four devices is shown in FIG. 2, in which three Q-PORT devices 100A, 100B and 100C and the legacy device 102 are connected in series. Information issued from the top of the chain will either be acted upon by the device if it is addressed to that device, or it will be passed along to lower devices. Broadcast commands are both acted on as well as passed on. Information coming up the chain will be passed on without alteration (except in the case of a legacy device handler).

Figure 3:
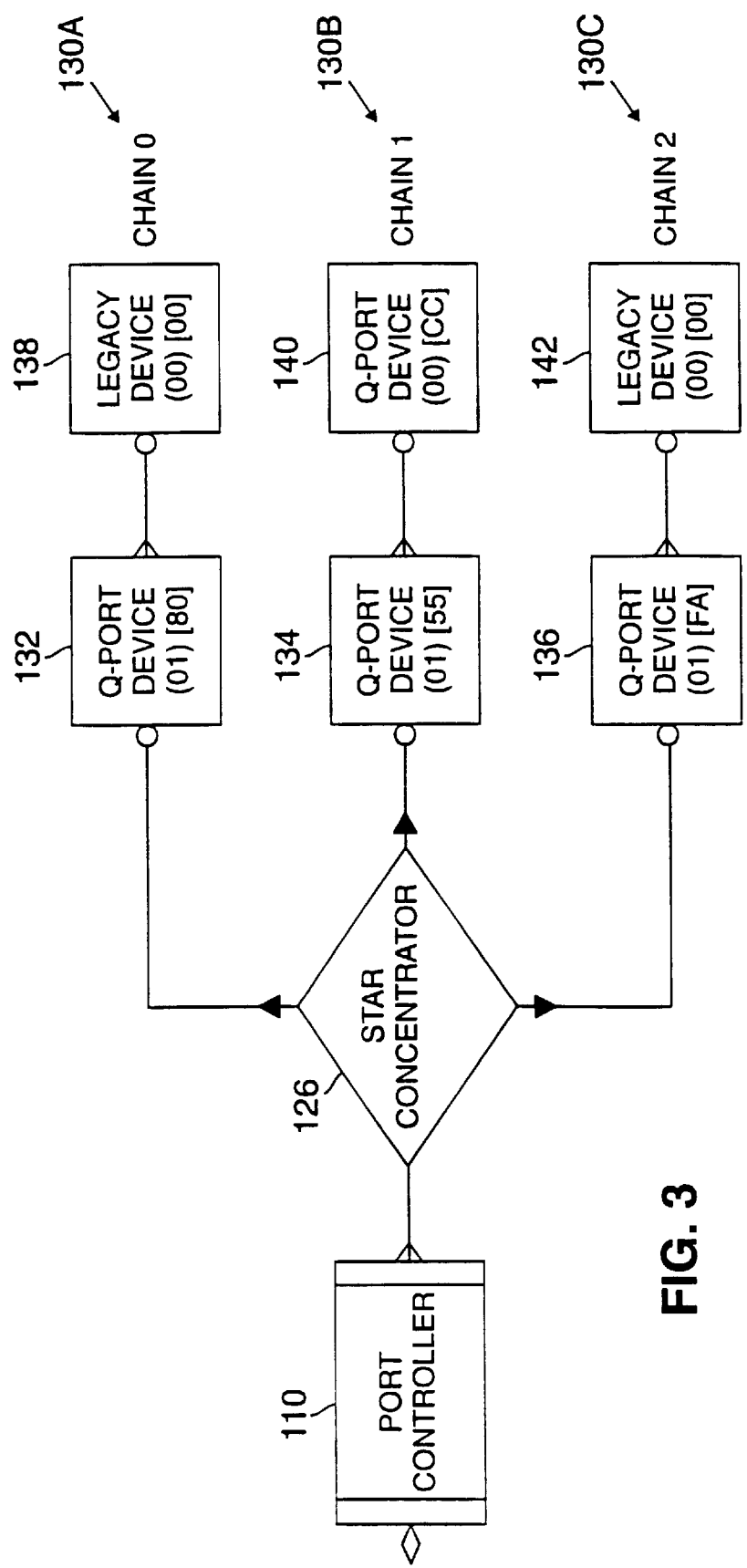
FIG. 3 is a schematic block diagram of peripheral devices attached in a "star" arrangement.

As shown in FIG. 3, in another example, three device chains 130A, 130B and 130C are connected together using a star concentrator 126, which appears as a host to the device chains 130A–C and which makes the chains appear as one long chain to its host. The star concentrator 126 translates the logical device addresses of the peripheral devices in the chains and passes data from the peripheral devices to the host computer system C.

The star concentrator 126 may optionally be incorporated in the port controller 110 and perform the logical device address translations after the serial-to-byte conversion, thus relieving the bandwidth requirements on the port controller's serial interface. The bandwidth would increase at the port controller's port-manager interface instead. With this option, the host computer system C sees multiple, functionally equivalent, slave ports and mechanical space, power supply limitations, and system bandwidth becomes the limiting factors on the fanout of the star connection rather than the bandwidth of the serial interface.

In the star configuration shown in FIG. 3, the star concentrator 126 performs the following logical device address translations for the port controller 110: address 0×00 of a legacy device 138 in device chain 130A is translated to address 0×00; address 0×00 of a legacy device 140 in the device chain 130C is translated to address 0×04; and so forth. In the example shown, the legacy device 138 and the legacy device 140 are of the same device type, e.g., device type 0×00. To allow proper routing by the port manager 114, each of the legacy devices 138 and 142 is associated with an individual device driver, as are Q-PORT devices 132, 134, 136 and 140.

Referring again to FIG. 1, the legacy device 102 has no slave port and is therefore, by definition, at the bottom end of the chain (logical device address of 0×00) as nothing can be plugged into it. The legacy device 102 can be connected directly to the computer system C or the last Q-PORT device in a device chain. The Q-PORT device 101 is capable of recognizing that the legacy device 102 is connected to its slave port 101 and supporting the legacy device 102 as a legacy device handler. Data going up the chain from the legacy device 102 is packetized by the legacy device handler and transported up the chain. Data coming down the chain has the header information removed by the legacy device handler before going to the legacy device 102.

Since a legacy device handler does not know the format and length of the packets of the legacy device 102, it may consider each byte received as a one-byte packet. Once the port manager 114 receives these packets, it passes the bytes on to the appropriate device driver individually. The device driver then re-assembles this stream of single bytes into a complete message.

Devices communicate with each other and with the port controller 110 through a serial bitstream directed through the host and slave ports. Each host port will have a male 6-Pin Mini-DIN connector, and each slave port will have a female 6-Pin Mini-DIN connector. Both the host and slave ports are bi-directional. In addition, each port includes a CLK line and a DAT line, with each line connected to a pull-up resistor having a value of 2.2k ohm, for example.

Host-to-slave transfers take priority over slave-to-host transfers. Q-PORT and legacy devices each has a buffer of sufficient size to hold an entire packet. Once the transfer of a packet begins, the entire packet must be transferred before any other information can be transferred from that port. Slave-to-host transfer bytes may interleave with host-to-slave bytes if the serial arbitration protocol allows for it, but all bytes in each packet must be received in each link without disturbing their order.

Figure 5:
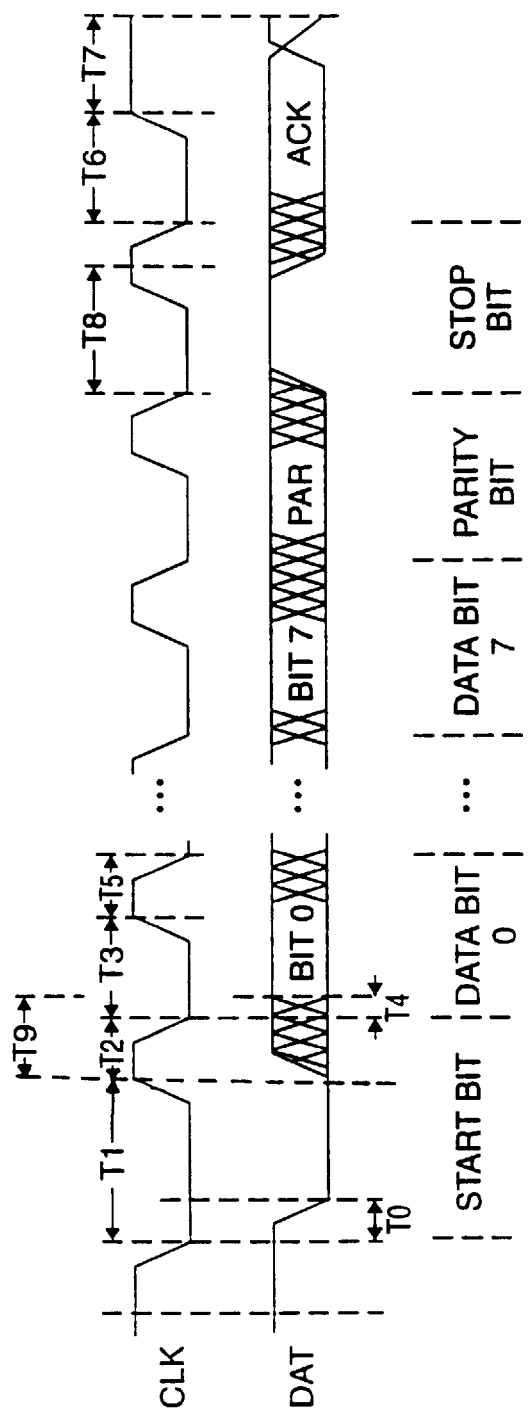
FIG. 5 is a timing diagram of a data transfer.

Referring to FIG. 5, a host-to-slave transfer is initiated by the host device first verifying that the serial interface is idle by checking that both the CLK and DAT lines are high. The host device then pulls the CLK line low and, within time period T0 (e.g. 5 µs), it drives the start bit by pulling the DAT line low. The CLK line is held low for about time period T1 (e.g. 100 µs) and then released which signals the slave device to clock the start bit in. The slave device then waits for about time period T2 (e.g. 40 µs [+/-10 µs]) with the CLK line released before the slave device pulls the CLK line low for about time period T3 (e.g. 40 µs [+/-10 µs]). After less than about time period T4 (e.g. 5 µs), the host device places data bit 0 on the DAT line by pulling the DAT line low if a "0" and releasing the DAT line if a "1." When the slave device releases the CLK line again, it samples the DAT line. The slave device then leaves the CLK line released for about time period T5 (e.g. 40 µs [+/-10 µs]) before pulling it low to initiate the transfer of data bit 1. The process is repeated for data bits 0–7, an odd parity bit, and a stop bit (which is a 1). After the stop bit is transferred, the slave device pulls the CLK line low for about time period T6 (e.g. 40 µs [+/-10 µs]) and then the slave device places an acknowledge bit (0=ACK, 1=NAK) on the DAT line. The DAT line is released about time period T7 (e.g. 40 µs [+/-10 µs]) after the CLK line is released. If the host device samples a NAK acknowledge bit, which occurs if a parity error is detected, for example, then the host device can assume the transfer was unsuccessful and it can retry the transfer.

If a slave device does not cycle the CLK line within about time period T9 (e.g. 50 µs) after the host device releases the CLK line in the start bit cycle, then a slave device is no longer connected to the host device's slave port. The host device detects this as the disconnected port state.

A slave-to-host transfer is performed in the same manner as the host-to-slave transfer, except that the slave device rather than the host device initiates the transfer by checking for an idle interface, the slave device drives the data bits, odd parity bit, and stop bit on the DAT line, and an acknowledge bit is not placed at the end. At the end of a slave-to-host transfer, if the host device needs extra time to process the received byte, it may inhibit or hold off further transfers by pulling the CLK line low within about a time period T8 (e.g. 50 µs) after the slave device has pulled the CLK line low to begin the stop bit transfer. When the slave device releases the CLK line, it will notice that the CLK line remains driven, indicating that the transfer has been inhibited. The interface remains inhibited until the host device releases the CLK line, at which time the interface returns to the idle state.

If a parity error is detected in a slave-to-host transfer, then the host device may issue a REQUEST_RESEND command to the slave device for re-transmission. If, during a slave-to-host transfer, the host device finds that it is out of synchronization with the slave device, the host device can signal a "framing error" condition by holding the DAT line low. This will be noticed by the slave device as soon as it attempts to drive a "1" on the DAT line, yet sees a "0" there instead. To regain synchronization, the slave device leaves the DAT line released and cycles the CLK line until it samples the DAT line pulled high again. The transfer then can be retried once the serial interface returns to the idle state.

While a host-slave interface is in the idle state, if either the host or slave device is unable to accept incoming data, or will be busy with another task long enough that it may miss the start bit, the device may inhibit the transfer by holding the CLK line low.

Communication in the Q-PORT system S takes the form of either broadcast communications or packet communications. Broadcast communications are single, double, or triple byte commands passed around the Q-PORT system S, such as during the logical device address assignment phase of the auto-configuration cycle. A packet moving down from the host computer system C is addressed to a specific device in a chain and a packet moving up from a device has the logical device address of the device which originated the packet.

Each packet includes header information followed by an optional data block. The header information contains a logical device address field to designate the target or source peripheral device and a packet descriptor field to specify the number of bytes in the data block. An example of a packet is shown in FIG. 4. The packet width is 8 bits and the data block can be from 0 to 16 bytes long, and the logical address field can be any 8-bit value except those reserved for broadcast commands.

Broadcast commands are used during the logical device address assignment phase of the auto-configuration cycle performed by the configuration manager 122. Broadcast commands are only used by the configuration manager 122 and are not be used be the device drivers 118 and 120. One broadcast command is the RESET command byte, which is issued by the configuration manager 122 in an auto-configuration cycle to cause every device in the device chain 100 to go to a known state and to recursively assign all the logical device addresses in the device chain.

Each of the following command bytes in the Q-PORT system S are transmitted as part of the data block in a packet. A SET_DEFAULT command is sent by the host computer system C to restore all settings in the peripheral device to its default value and to disable the device. A DISABLE command is sent to disable a peripheral device from sending any unsolicited packets while in periodic or event driven modes. The ENABLE command is sent to enable a device to send unsolicited packets while in periodic or event driven modes. After each of the above commands is received and executed, the device acknowledges by returning an ACK command in a packet to the host computer system C.

A READ_DEVICE_TYPE command causes the receiving device to respond with a packet containing the device's device type. The device type information is used during the auto-configuration cycle by the configuration manager 122. The host computer system C recognizes that this command was received and executed when it receives the device type packet.

The port manager 114 signals the configuration manager 122 to perform the auto-configuration cycle in response to several events: on initial entry of the port manager 114; when a RESET_REQ byte is received from some device; or by sending an unexpected RESET_ACK byte to the configuration manager 122. During the auto-configuration cycle, the port manager 114 communicates only with the configuration manager 122 and ignores any other device drivers.

Figure 6A:
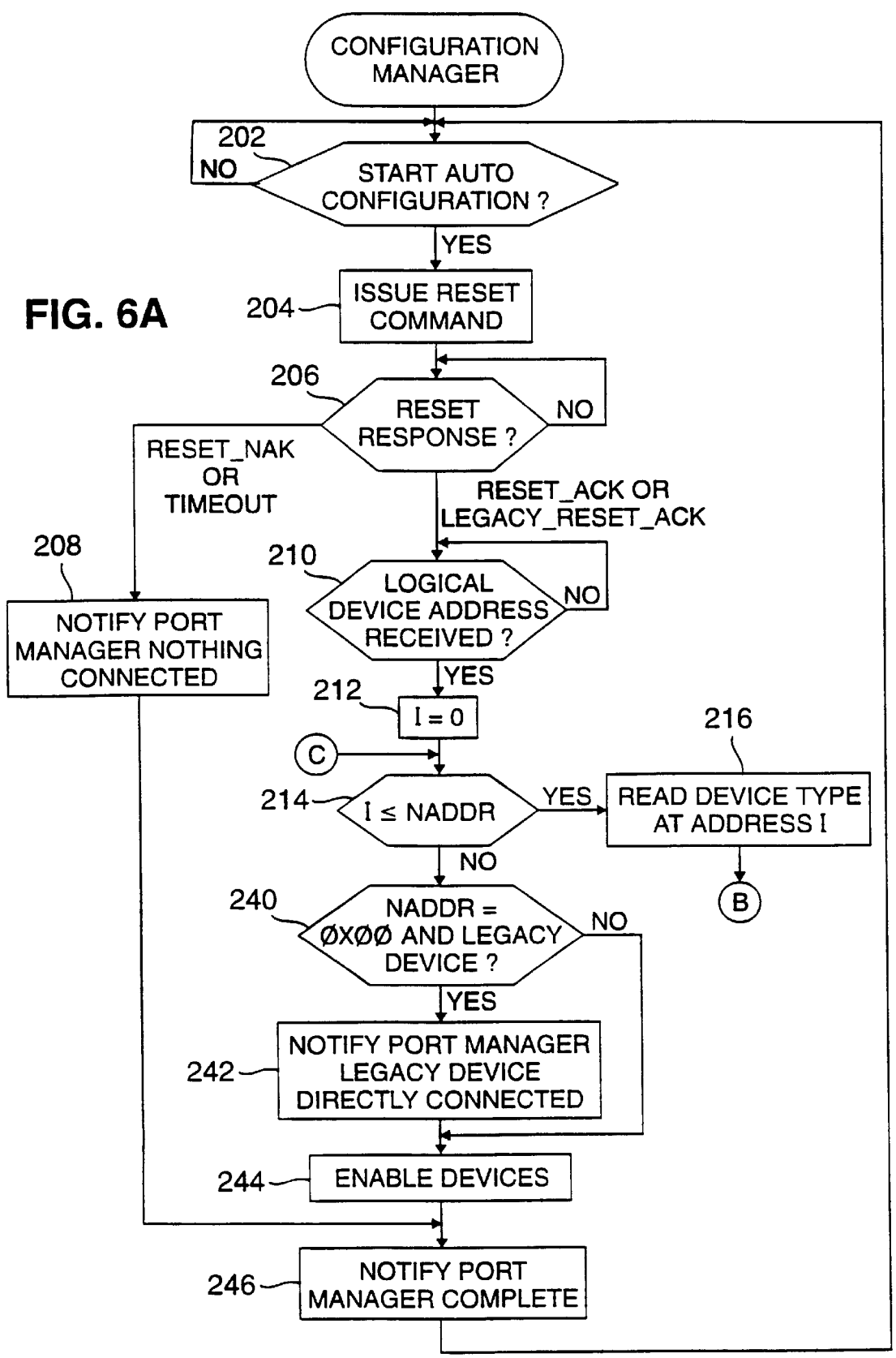
FIGS. 6A and 6B are a flow diagram of an configuration manager for performing auto-configuration cycles.
Figure 6B:
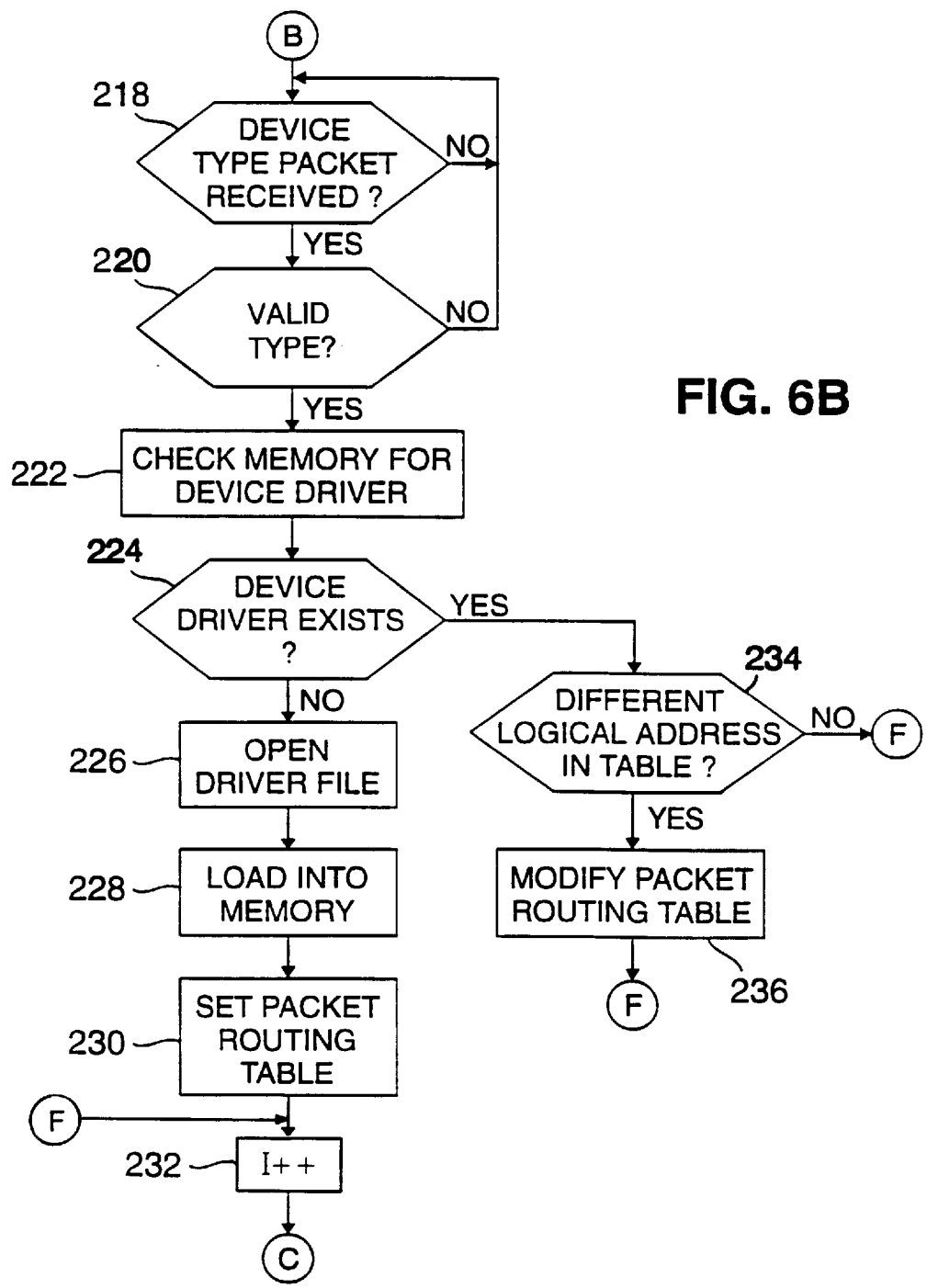

Referring to the flow diagram of FIGS. 6A–6B, the configuration manager 122 starts 202 an auto-configuration cycle when the port manager 114 informs it that the device chain configuration has changed. The configuration manager 122 first issues 204 a RESET command and waits 206 for a reset response. If a RESET_NAK byte is received, indicating a non-functional Q-PORT device, or a time-out is detected, the configuration manager 122 notifies 208 the port manager 114 that nothing is connected and also notifies 246 the port manager 114 that the auto-configuration cycle is complete. If the port controller code is not written to check for time-out conditions, a small piece of software may monitor the functions of the port controller 110 and check for time-outs. This software could report these errors to the port controller 110, which would pass these on to the port manager 114. The time-out checking function can also be included directly in the port controller code.

If the configuration manager 122 receives a RESET_ACK or LEGACY_RESET_ACK byte, it waits 210 for a logical device address NADDR to be transmitted from the device chain 100. A legacy device responds to a RESET command by issuing a 3-byte sequence: a LEGACY_RESET_ACK byte, a LEGACY_ACK byte, and a LEGACY_DEVICE_TYPE byte. The RESET_ACK, RESET_NAK, LEGACY_RESET_ACK, LEGACY_ACK, LEGACY_DEVICE_TYPE and logical device address bytes are transmitted as broadcast commands by the peripheral devices.

After a logical device address is received, the configuration manager 122 resets 212 an increment variable I to zero. If the configuration manager 122 determines 214 that the variable I is less than or equal to the value of the received logical device address NADDR, it transmits 216 a READ_DEVICE_TYPE command packet to the device at logical device address I. The configuration manager 122 then waits 218 for the receipt of a device type packet. During the auto-configuration cycle, the port manager 114 forwards the data block portion of any received packet to the configuration manager 122. After receipt of data, the configuration manager 122 determines 220 if the device type is a valid type. A legacy device responds to the READ_DEVICE_TYPE command by first issuing a LEGACY_ACK byte, which is an invalid device type. If an invalid type is detected 220, the configuration manager 122 waits 218 for another packet.

Once a valid device type packet is received, the configuration manager 122 checks 222 host computer system memory (not shown) to determine 224 if the device driver associated with the device type is loaded. If the device driver does not exist, the configuration manager 122 opens 226 the appropriate device driver file from the mass storage device, e.g., hard disk drive, of the host computer system C and loads 228 the device driver into host computer system memory. The configuration manager 122 then adds 230 an entry associated with the new device type into a packet routing table for use by the port manager 114. Each entry of the packet routing table includes the device driver name and the associated logical device address and device type of the physical peripheral device associated with the device driver. The configuration manager 122 then increments 232 the value of the variable I by one and checks 214 if the variable I is less than or equal to the received logical device address NADDR.

If the configuration manager 122 determines 224 that a device driver is already loaded in host computer system memory, it checks 234 the routing table to compare the received logical device address with the stored logical device address. If the addresses are different, then the configuration manager 122 modifies the appropriate routing table entry to associate the device driver to the correct logical device address.

If the configuration manager 122 determines 214 that the variable I has a value greater than the address NADDR, and if it determines 240 that the address NADDR has the value 0x00 and the connected peripheral device is a legacy device, the configuration manager 122 notifies 242 the port manager 114 that the legacy device is directly connected. A directly-connected legacy device does not have a Q-PORT device to act as its legacy device handler, which would require the port manager 114 to essentially act as a byte pipeline between the legacy device and the legacy device driver, performing no interpretation, other than handling broadcast commands.

The configuration manager 122 then sends 244 ENABLE command packets to each of the peripheral devices in the device chain to enable the peripheral devices. Next, the configuration manager 122 notifies 246 the port manager 114 that the auto-configuration cycle is complete.

Figure 7A:
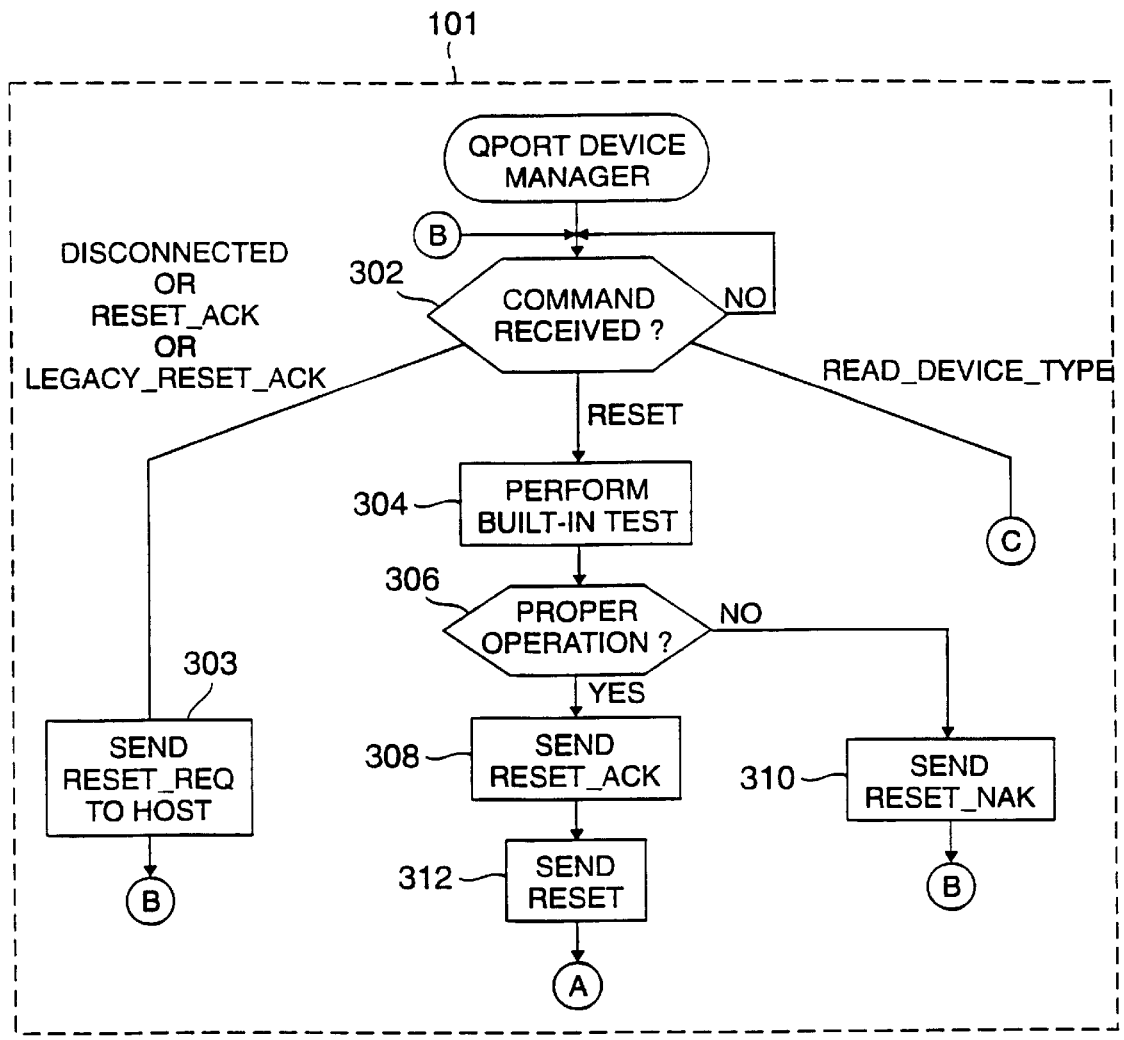
FIGS. 7A, 7B and 7C are a flow diagram of a device manager for controlling a peripheral device.
Figure 7B:
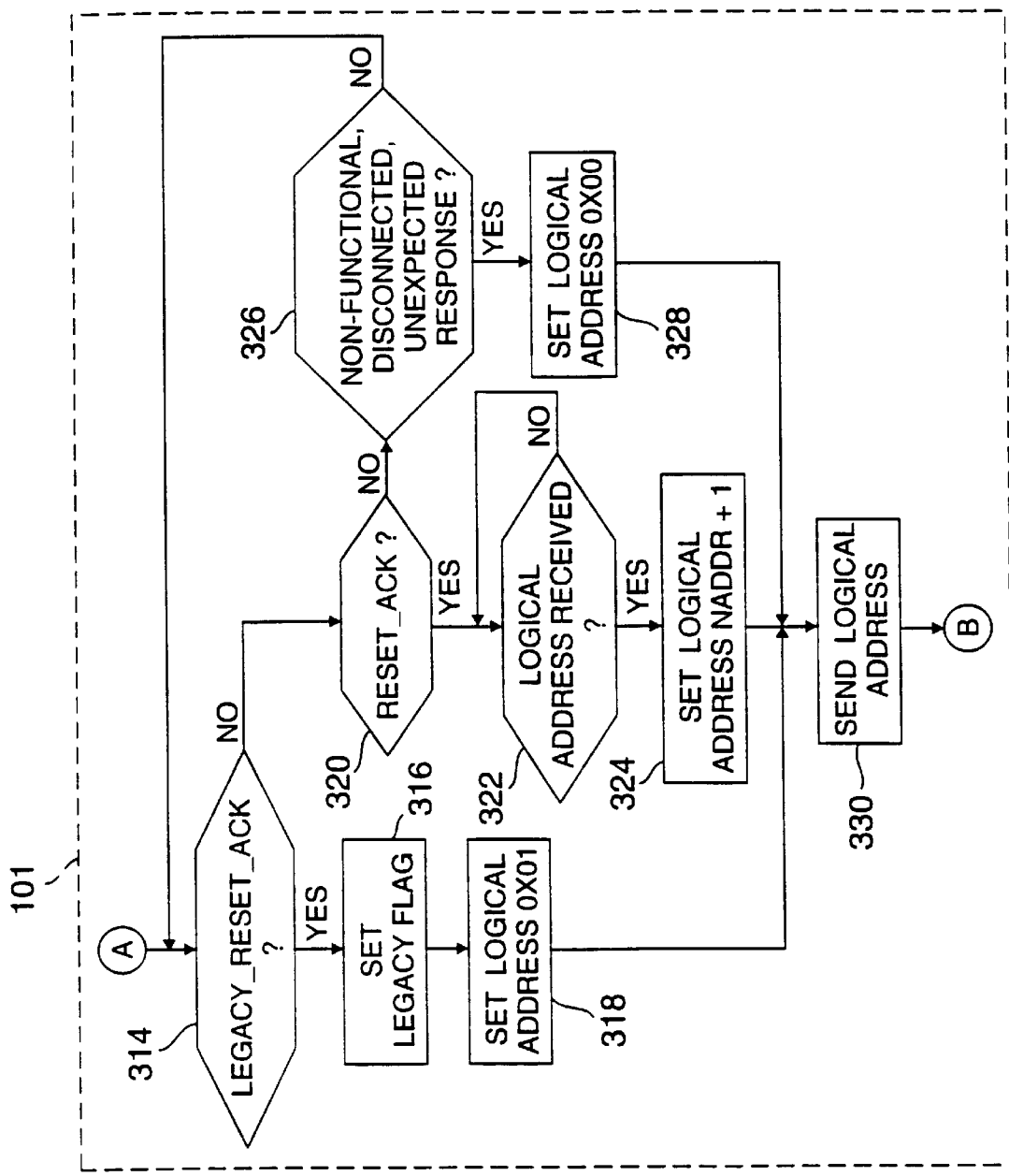
Figure 7C:
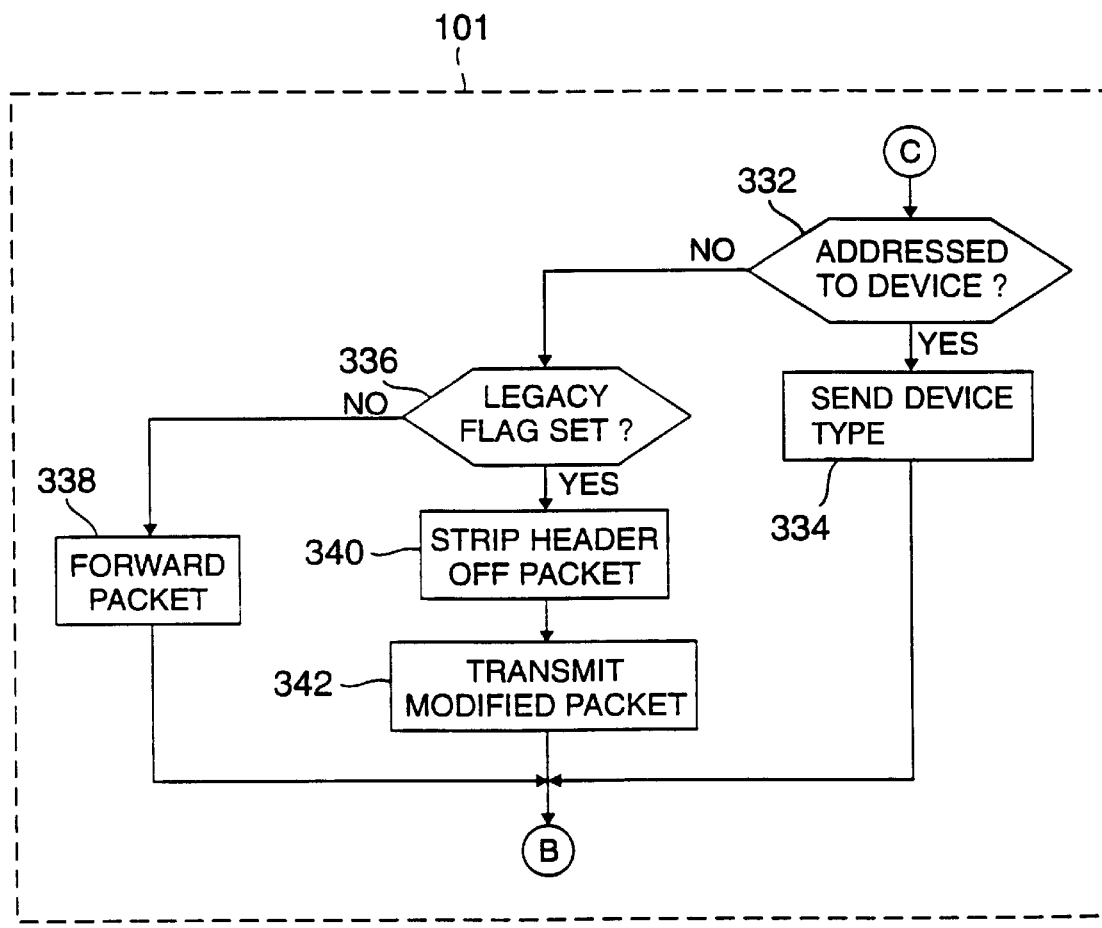

The flow diagram of FIGS. 7A–C shows the response of the Q-PORT device to certain command bytes. If the Q-PORT device receives 302 a RESET command, it performs 304 a power-on reset cycle which includes a Built-In-Test (BIT) procedure. If the Q-PORT device determines 306 that it is functioning properly, it issues 308 a RESET_ACK byte to the host and issues 312 a RESET command to its slave. Any packets received by the slave port of the Q-PORT device must be flushed before the RESET command can be sent by the Q-PORT device.

The Q-PORT device expects the slave to respond in one of the following ways: a disconnected port state, indicating that the device is not connected to a slave; a RESET_NAK command, indicating a non-functional slave; a LEGACY_RESET_ACK command, indicating a legacy device is connected as the slave and has passed its BIT procedure; or a RESET_ACK command, indicating the slave is a Q-PORT device and has passed its BIT procedure.

If the Q-PORT device receives 314 the LEGACY_RESET_ACK command, then the Q-PORT device sets 316 its legacy internal flag to identify itself as the legacy device handler and sets 318 its logical device address at 0×01. If instead the Q-PORT device receives 320 a RESET_ACK command, indicating that the slave device is another Q-PORT device, it waits 322 for the slave device to send its logical device address. The Q-PORT device sets 324 its logical device address as the slave's logical device address plus one.

However, if the Q-PORT device discovers 326 that its slave port is disconnected, the slave is not functional, or an unexpected response is received, then the Q-PORT device assumes it is the last functional device in the device chain and sets 328 its logical device address at 0×00. After setting its logical device address, the Q-PORT device sends 330 the address to the host.

If the Q-PORT device receives 302 a reset response (RESET_ACK or LEGACY_RESET_ACK) from its slave without having first issued a RESET command to that slave, or it detects that the slave has become disconnected, then the Q-PORT device sends 303 a RESET_REQ byte (a broadcast command) up the device chain to the configuration manager 122, which responds by performing an auto-configuration cycle.

If the Q-PORT device receives 302 a READ_DEVICE_TYPE command and the command is addressed 332 to the Q-PORT device, the Q-PORT device sends 334 a packet containing its device type to the host. Normally, if the command packet is not addressed 332 to the Q-PORT device, it would simply forward 338 the packet to the slave, but if the internal legacy flag is set 336, the Q-PORT device strips 340 the header off the packet before passing 342 it on to the slave. The legacy device will respond to the READ_DEVICE_TYPE command by issuing a LEGACY_ACK byte followed by a LEGACY_DEVICE_TYPE byte.

Figure 8:
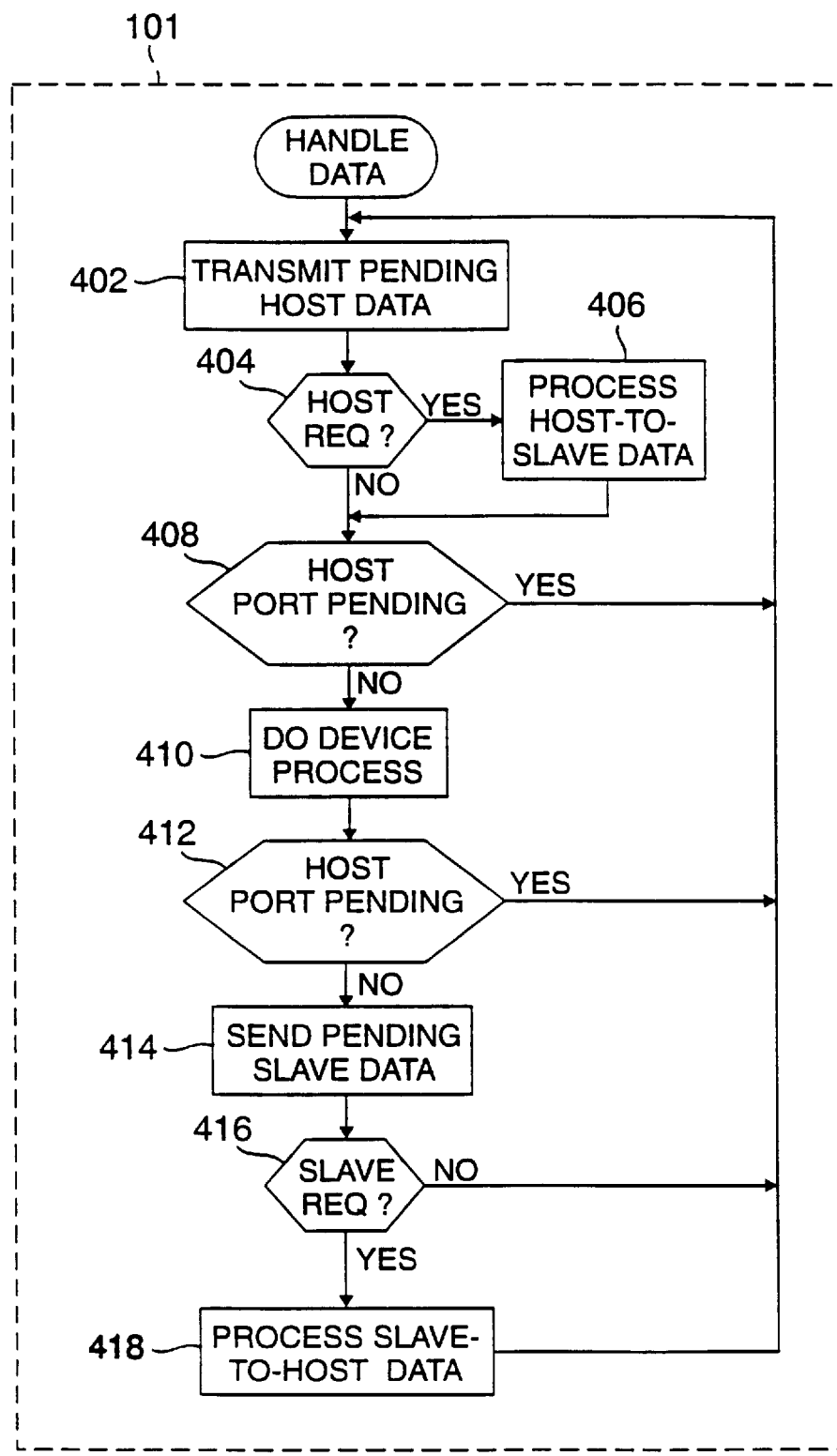
FIG. 8 is a flow diagram of the device manager of FIGS. 7A, 7B and 7C for handling data transfer requests.

Referring to the flow diagram of FIG. 8, the device manager in a Q-PORT device handles pending data transfer requests. The host port of the Q-PORT device contains a host FIFO queue for storing upstream data, and the slave port of the Q-PORT device contains a slave FIFO queue for storing downstream data. The host and slave FIFO queues each has the capacity to store at least one data packet. Initially, the device manager transmits 402 any upstream host data pending in the host FIFO queue. After a byte of data has been transmitted, if a host device transfer is pending 404 (i.e., host device has taken control of DAT line), priority is given to the host-to-slave transfer and the host device data transfer is processed 406.

If upstream data is pending 408 in the host FIFO queue, the device manager transmits 402 the next byte of the upstream data. However, if upstream data byte is not pending 408, any input from the user interface is processed 410. For example, if the Q-PORT device is a keyboard, the pressing of a keyboard by the user would be processed in this step. Next, if upstream data is pending 412 in the host FIFO queue, the data is transmitted 402. If upstream data is not pending 412, then all downstream data pending in the slave FIFO queue are transmitted 414. Next, if a data transfer request is pending 416 from a slave device, the slave-to-host data is transmitted 418.

The following provides an example of an auto-configuration cycle. To begin with, the host computer system C is unconnected with any peripheral devices. On power-up, the configuration manager 122 is initiated and issues a RESET command to the port manager 114. The port manager 114 passes this RESET command to the port controller 110, but as there are no devices present, the transfer times out and the port controller software responds with a RESET_REQ byte, which indicates to the configuration manager 122 that nothing is connected.

Next, a Q-PORT device (having a device type of 0×80) is inserted into the computer port 112. When the Q-PORT device receives power, it runs its power-on reset cycle, which (assuming BIT passed) sends a RESET_ACK byte back through the port controller 110. The port manager 114 recognizes the RESET_ACK byte as being a broadcast command and routes it to the configuration manager 122. The configuration manager 122 is not expecting receipt of the RESET_ACK byte, as the previous configuration cycle showed no devices were connected. In response, the configuration manager 122 issues a RESET command through the port manager 114 and port controller 110 to start an auto-configuration cycle.

If the Q-PORT device had already issued its logical device address, the port controller 110 ignores the RESET command. Otherwise, since the host transfer takes precedence, the RESET command is sent on to the Q-PORT device. Upon receipt of the RESET command, the Q-PORT device again does a BIT and responds with the RESET_ACK byte followed by a logical device address of 0×00. The port manager 114 again recognizes these two bytes as being broadcast commands and routes them both to the configuration manager 122.

This time, the configuration manager 122 is expecting a RESET response of some sort, and so recognizes that there is one device in the device chain located at logical device address 0×00. The configuration manager 122 then issues a READ_DEVICE_TYPE command and the Q-PORT device returns a packet containing a device type of 0×80. The port manager 114 recognizes the incoming data as a packet, but realizes that the configuration manager 122 is still performing an auto-configuration cycle, so it routes the data block portion of the packet containing the device type to the configuration manager 122.

Next, the configuration manager 122 opens the device driver file in the mass storage device corresponding to a device type of 0×80. This device driver is loaded into memory, and the configuration manager 122 sets up a routing table for the port manager 114 to route packets having a logical device address of 0×00 to the loaded device driver, and conversely, that data from the device driver be packetized and sent to logical device address 0×00.

The configuration manager 122 then issues an ENABLE command to both the device driver and the port manager 114 to start the connection. Next, the configuration manager 122 exits from auto-configuration. Packets to and from the Q-PORT device are transferred according to the routing table until a hardware configuration change occurs.

Next, a legacy device (having device type 0x00) is connected to the slave port of the previously inserted Q-PORT device. When the Q-PORT device performed a power-on reset sequence after it was inserted, it determined that there was no device connected to its slave port. If a legacy device gets plugged into the slave port, the legacy device also runs a power-on reset sequence and a BIT. If the BIT passed, the legacy device issues to a LEGACY_RESET_ACK byte, a LEGACY_ACK byte, and a LEGACY_DEVICE_TYPE byte to its host, the Q-PORT device. As the Q-PORT device is not expecting receipt of the bytes, it realizes that its slave port connection has changed. As a result, it sends a RESET_REQ byte to its host port.

When the port manager 114 receives the RESET_REQ byte, it recognizes it as a broadcast command and routes it to the configuration manager 122. In response, the configuration manager 122 issues a RESET command to the port manager 114, which forwards this through the port controller to the device chain. The Q-PORT device receives this RESET command and performs a BIT. If successful, the Q-PORT device sends a RESET_ACK byte to its host port. Next, it sends the RESET command to its slave port. In response to the RESET command, the legacy device runs another BIT and resends the sequence containing the LEGACY_RESET_ACK byte, LEGACY_ACK byte, and LEGACY_DEVICE_TYPE byte.

The Q-PORT device sees this sequence and recognizes that its slave device is a legacy device because of the LEGACY_RESET_ACK byte, so the Q-PORT device sets an internal legacy flag to set itself as the legacy handler for its slave. At this point, the Q-PORT device knows that its slave device has a logical device address of 0x00, and it, therefore, must have a logical device address of 0x01. The Q-PORT device then issues the logical device address of 0x01 to its host port.

The port manager 114 had previously received the Q-PORT device's RESET_ACK byte, and so it was expecting the logical device address next. Both the RESET_ACK byte and the logical device address are passed on to the configuration manager 122. The configuration manager 122 now knows there are two devices in the device chain. It first issues a packet containing the READ_DEVICE_TYPE command to the device at logical device address 0x00, which is received by the Q-PORT device. Normally, since the packet is not addressed to the Q-PORT device, it would simply pass it along to its slave port. However, since the Q-PORT device is the legacy device handler, and the logical device address on the packet is 0x00, the Q-PORT device strips the header off the packet and passes it on to its slave port.

Upon receipt of the READ_DEVICE_TYPE command, the legacy device first issues a LEGACY_ACK byte to its host port. When the Q-PORT device receives this, it adds the header with a logical device address of 0x00 and a byte count of 0x1. The port manager 114 receives this packet and does not pass it on to the device driver indicated in its routing table for device 0x00; instead, it sends the data (which is the LEGACY_ACK byte) to the configuration manager 122 as the auto-configuration cycle is still in progress. The configuration manager 122 knows that the LEGACY_ACK byte is an invalid device type, so it ignores it.

Next, the legacy device issues the real LEGACY_DEVICE_TYPE byte, which the Q-PORT device packetizes and sends via the port controller 110 and port manager 114 to the configuration manager 122. The configuration manager 122 sees that the device driver for this device type is not loaded in memory, so it searches the mass storage device for the corresponding device driver and loads it into memory. The configuration manager 122 then sets up the packet routing table for the port manager 114 to direct packets to and from the device at logical device address 0x00 to the new device driver.

Next, the configuration manager 122 issues a packet containing a READ_DEVICE_TYPE command to the device at logical device address 0x01. The Q-PORT device receives this and responds with a packet containing the device type of 0x80. The configuration manager 122 receives this byte, and sees that it already has this device driver in memory, so all it need do is point the packet routing table in the port manager 114 to this device driver for all packets to or from logical device address 0x01.

As the configuration manager 122 has attached all the relevant device drivers to the Q-PORT system, it sends ENABLE commands to each device and device driver in turn and signals the port manager 114 that the auto-configuration cycle has finished and the configuration manager 122 exits.

Next, the legacy device at logical device address 0x00 is removed. Nothing happens until something is sent to the legacy device. The transmitted packet arrives at the Q-PORT device, which removes the header from the packet and sends the first byte of the data block to the Q-PORT device's slave port. The Q-PORT device detects that its slave port has become disconnected. In response, the Q-PORT device sends a RESET_REQ byte out its host port. The RESET_REQ byte is routed to the configuration manager 122, which initiates an auto-configuration cycle by sending the RESET command out. The RESET response indicates that only one device is in the device chain and it is at logical device address 0x00. The configuration manager 122 queries this device and discovers it is the Q-PORT device with the device type of 0x80. The configuration manager 122 recognizes that the device driver is in memory for the device type of 0x80. The configuration manager 122 modifies the packet routing table by changing the logical device address associated with the Q-PORT device's device driver. The unused device driver for device type 0x00 is unloaded from memory and the configuration manager 122 signals the end of the auto-configuration cycle to the port manager 114 and exits.

Other embodiments are also within the scope of the claims. For example, other types of serial interfaces can be used and the packet and broadcast command widths can be varied.

What is claimed is:

1. A method for allowing peripheral devices to be added to a port of a computer system while the computer system is powered on, the computer system having a configuration program, the method comprising:

automatically detecting addition of a peripheral device to the computer system port;

the configuration program transmitting a configuration command requesting address information of the peripheral devices; and the peripheral devices recursively generating their own unique addresses based on the number of peripheral devices connected in response to the configuration command, wherein a peripheral device's address is dependent upon the device's position relative to the computer system port.

2. The method of claim 1, wherein the computer system port includes a serial port.

3. The method of claim 1, further comprising:

automatically detecting removal of a peripheral device from the computer system port; and automatically performing the transmitting and generating if removal of the peripheral device has been detected.

4. The method of claim 1, wherein the computer system includes a storage device, and wherein the method further includes retrieving a device driver associated with a peripheral device from the storage device.

5. The method of claim 4, wherein the computer system further includes a memory, and wherein the method further includes loading the device driver into the memory.

6. The method of claim 4, wherein the method further includes checking for a device type of a peripheral device and retrieving the device driver from the storage device based on the device type.

7. The method of claim 1, wherein a second peripheral device is connected to a first peripheral device, the method further comprising:

the first peripheral device determining if the second peripheral device is connected, and if so, the first peripheral device forwarding the configuration command to the second peripheral device.

8. The method of claim 7, wherein the first peripheral device has a logical address, the method further comprising:

setting the logical address according to whether the second peripheral device is connected to the first peripheral device.

9. The method of claim 1, further comprising:

each peripheral device performing a self test in response to the configuration command.

10. The method of claim 1, wherein the peripheral devices are connected in a serial chain.

11. The method of claim 10, wherein the computer system port includes a serial port.

12. The method of claim 10, wherein the peripheral device most downstream from the computer system port has the lowest address while the peripheral device closest to the computer system port generates the highest address.

13. The method of claim 1, further comprising:

the configuration program automatically detecting removal of a peripheral device from the computer system port;

the configuration program transmitting a configuration command requesting address information of one or more of the peripheral devices; and a connected peripheral device updating its address information and transmitting it to the configuration program.

14. A method for configuring peripheral devices connected to a single port of a computer system, the method comprising:

issuing a configuration command;

automatically determining the number of peripheral devices connected to the single port in response to the configuration command; and the peripheral devices recursively generating their addresses in response to the configuration command such that a unique address is assigned to each of the peripheral devices, each peripheral device generating its own address and providing that address to a next peripheral device until each peripheral device has assigned its address.

15. The method of claim 14, further comprising:

automatically determining the type of each peripheral device.

16. The method of claim 14, wherein the computer system includes a memory, the method further comprising:

automatically loading a plurality of device drivers into the computer system memory, each device driver corresponding to a peripheral device.

17. The method of claim 16, further comprising:

setting up a routing table having a plurality of entries, each entry corresponding to a peripheral device and containing a device driver name and the address of the corresponding peripheral device.

18. The method of claim 17, further comprising:

adding entries to the routing table as additional peripheral devices are added.

19. The method of claim 18, further comprising:

removing entries from the routing table as peripheral devices are removed.

20. The method of claim 14, wherein the peripheral devices are connected in one of a plurality of hardware configurations.

21. The method of claim 14, wherein a first peripheral device is connected directly to the computer system port, and wherein at least one other peripheral device is connected to the computer system port through the first peripheral device.

22. The method of claim 14, wherein the computer system port includes a serial port.

23. Apparatus for allowing peripheral devices to be added to and removed from a port of a computer system while the computer system is powered on, the apparatus comprising:

a detector for issuing notification that a peripheral device has been inserted into the computer system port; and a configuration manager which responds to the notification by broadcasting a configuration command, the peripheral devices recursively generating unique address values based on the number of peripheral devices connected in response to the configuration command, each peripheral device generating its own address and providing that address to a next peripheral device until each peripheral device has assigned its address.

24. The apparatus of claim 23, wherein the computer system port includes a serial port.

25. The apparatus of claim 23, wherein the detector also issues notification if the peripheral device is removed from the computer system port.

26. The apparatus of claim 23, wherein the computer system includes a storage device, and wherein the configuration manager retrieves device drivers associated with the peripheral devices from the storage device.

27. The apparatus of claim 26, wherein the computer system further includes a memory, and wherein the configuration manager loads the device drivers into the memory.

28. The apparatus of claim 26, wherein the configuration manager is further configured to check for device types of the peripheral devices and to retrieve the device drivers from the storage device based on the device types.

29. The apparatus of claim 23, wherein a first peripheral device has an input port and an output port, the input port being connected to the computer system port.

30. The apparatus of claim 29, wherein a second peripheral device is connectable to the output port of the first peripheral device.

31. The apparatus of claim 30, wherein the first peripheral device issues a second notification to the detector if a second peripheral device is inserted into the output port, and wherein the detector responds to the second notification by issuing the first notification.

32. The apparatus of claim 23, wherein the peripheral device performs a self test in response to the configuration command.

33. Apparatus for configuring peripheral devices connected in a serial chain to a single port of a computer system, comprising:

a configuration manager in the computer system configured to transmit a configuration command; and device managers in the peripheral devices configured to respond to the configuration command by recursively generating addresses for the peripheral devices such that a unique address is assigned to each of the peripheral devices, wherein an address is assigned to a peripheral device based on its position in the serial chain, each peripheral device generating its own address and providing that address to a next peripheral device until each, peripheral device has assigned its address.

34. The apparatus of claim 33, wherein the computer system includes a memory, and wherein device drivers are loaded into the computer system memory, each device driver corresponding to a peripheral device.

35. The apparatus of claim 34, wherein the configuration manager further sets up a routing table having a plurality of entries, each entry corresponding to a peripheral device and containing a device driver name and the address of the corresponding peripheral device.

36. The apparatus of claim 35, wherein the configuration manager adds entries to the routing table as additional peripheral devices are added.

37. The apparatus of claim 36, wherein the configuration manager removes entries from the routing table as peripheral devices are removed.

38. The apparatus of claim 33, wherein the peripheral devices are connected in one of a plurality of hardware configurations.

39. The apparatus of claim 38, wherein the peripheral devices are connected in a serial chain.

40. The apparatus of claim 39, wherein a first peripheral device is connected directly to the computer system port and at least one other peripheral device is connected to the computer system port through the first peripheral device.

41. A computer system, comprising:

peripheral devices;

a peripheral port for connecting to the peripheral devices;

a port manager for transmitting a notification if a peripheral device has been inserted into the peripheral port; and a configuration manager which responds to the notification by performing a configuration operation, wherein the configuration operation includes:
transmitting a configuration command,
the peripheral devices recursively generating their address values based on the number of peripheral devices connected,
receiving the address values from the peripheral devices, and
storing the address values.

42. The computer system of claim 41, wherein the peripheral port includes a serial port.

43. The computer system of claim 41, wherein the port manager also transmits the notification if the peripheral device is removed from the peripheral port.

44. The computer system of claim 41, further comprising:

a storage device for storing a device driver associated with the peripheral device, wherein the configuration operation includes retrieving the device driver from the storage device.

45. The computer system of claim 44, further comprising:

a memory, wherein the configuration operation further includes loading the device driver into the memory.

46. The computer system of claim 41, wherein a second peripheral device is connected to a first peripheral device, the address value generated by the first peripheral device being dependent upon whether the second peripheral device is connected.

47. The computer system of claim 41, wherein the peripheral devices are connected in a serial chain.

48. The computer system of claim 47, wherein an address value assigned each peripheral device depends on its position in the serial chain.

49. A computer system, comprising:

a processor;

a peripheral port;

a first peripheral device connected to the port;

a second peripheral device connectable to the first peripheral device;

a third peripheral device connectable to the second peripheral device; and a configuration manager executed on the processor for issuing a configuration command to the peripheral port, wherein the first peripheral device responds to the configuration command by setting its address information according to whether the second peripheral device is connected, and wherein the second peripheral device responds to the configuration command by setting its address information according to whether the third peripheral device is connected.

50. The computer system of claim 49, wherein the peripheral port includes a serial port.

51. A method of configuring first and second devices coupled to a computer port, the method comprising:

a configuration program in the computer issuing a first configuration command;

the first peripheral device receiving the first configuration command and issuing a second configuration command to the second peripheral device; and the second peripheral device transmitting its address information to the first peripheral device in response to the second configuration command; and the first peripheral device transmitting its address information that is dependent on the address information of the second peripheral device to the configuration program.

* * * * *